United States Patent [19]
Brown et al.

[11] 3,915,866
[45] Oct. 28, 1975

[54] HIGH PRESSURE FILTERING DEVICE
[75] Inventors: Carl A. Brown, Birmingham; Martin K. Kleine, West Bloomfield, both of Mich.
[73] Assignee: Parker-Hannifin Corporation, Cleveland, Ohio
[22] Filed: Oct. 11, 1973
[21] Appl. No.: 405,294

[52] U.S. Cl. .................................. 210/341; 210/424
[51] Int. Cl.[2] .......................................... B01D 35/12
[58] Field of Search ............. 210/90, 130, 132, 340, 210/341, 424

[56] References Cited
UNITED STATES PATENTS

| | | | |
|---|---|---|---|
| 1,759,927 | 5/1930 | Zwicky | 210/340 X |
| 2,681,736 | 6/1954 | Voorheis | 210/341 |
| 3,349,914 | 10/1967 | Kudlaty | 210/341 X |
| 3,618,781 | 11/1971 | Brown | 210/341 |

*Primary Examiner*—Frank A. Spear, Jr.
*Attorney, Agent, or Firm*—Gifford, Chandler & Sheridan

[57] ABSTRACT

A filtering device having two paths for the fluid to be filtered, which are alternately placed into communication with the fluid to be filtered by means of a manually actuated selector valve disposed in the housing between the two fluid paths, a different filter element operatively associated with each of the paths, and a different fluid pressure indicator and by-pass valve operatively associated with each of the filter elements. The selector valve isolates one of the filter elements from the fluid carrying conduit while directing flow through the other filter element so that the isolated filter may be replaced without having to stop the filtering operation. The indicator provides a means for determining the condition of the filter in use without having to remove the filter for inspection, and the by-pass valve provides a path for by-passing the filter in the event that it becomes unduly clogged and the switching valve has not been actuated to switch operation to the other filter element. A fail-safe outlet means provides a controlled path for pressurized fluid to the exterior of the device in the event that a predetermined pressure is exceeded.

3 Claims, 7 Drawing Figures

Fig-2

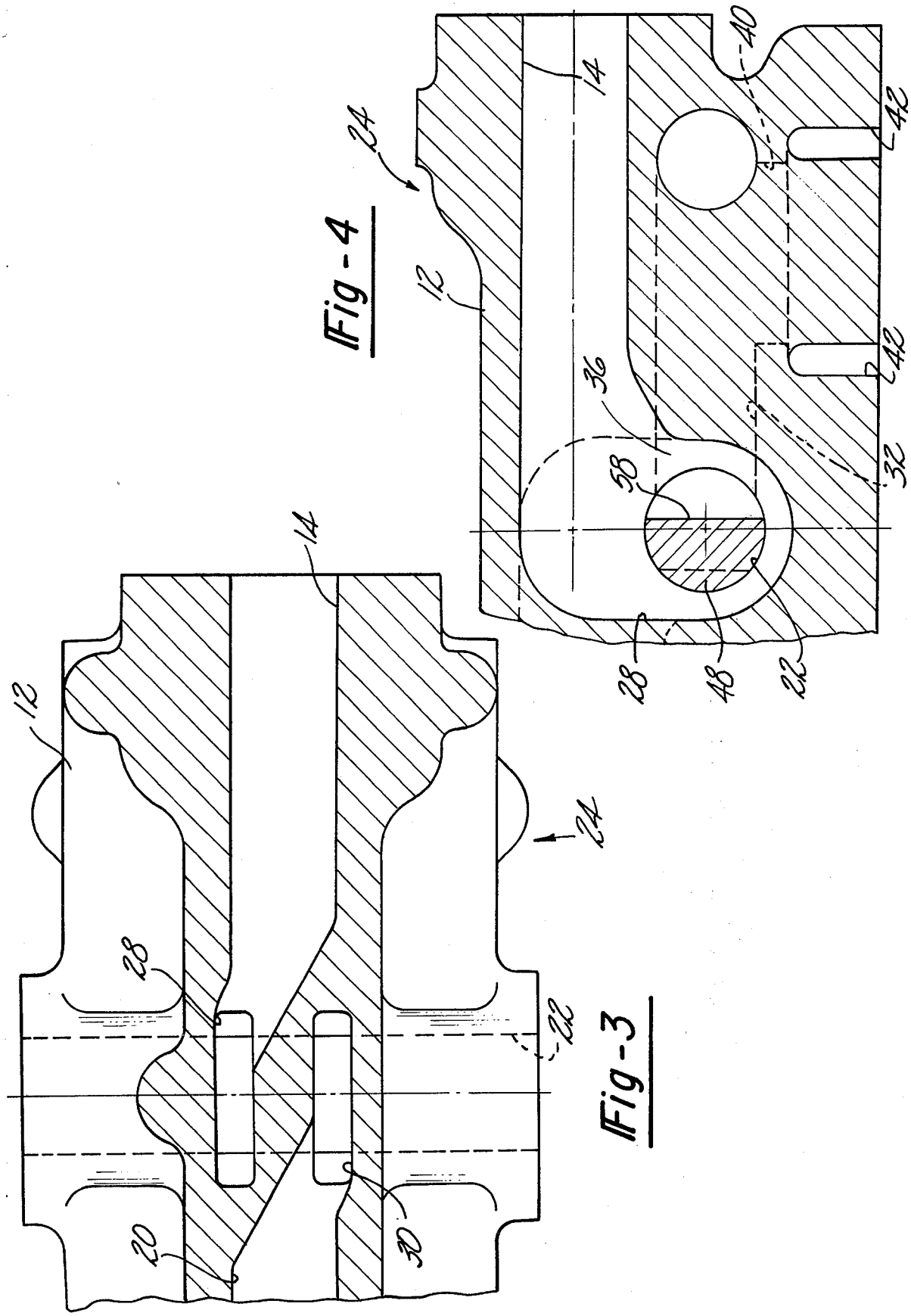

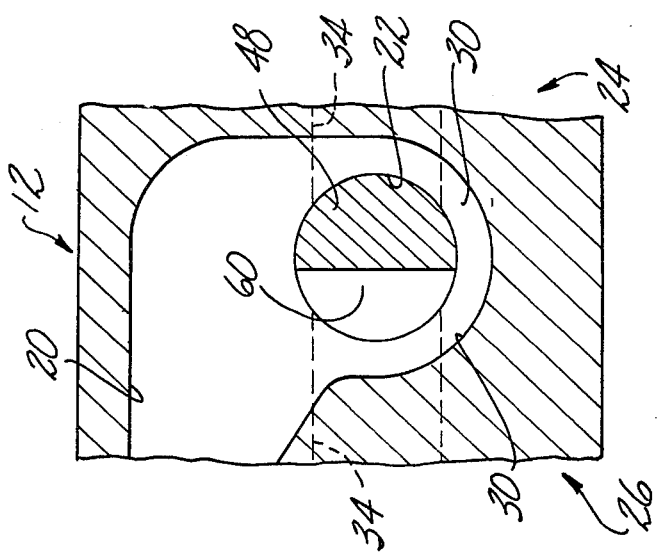
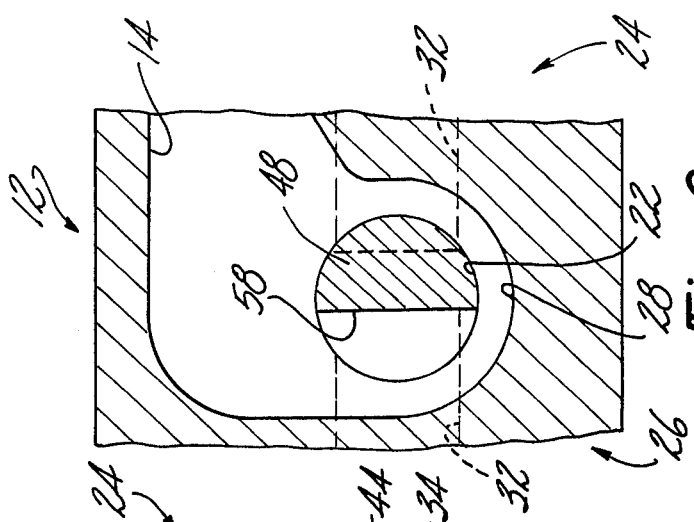
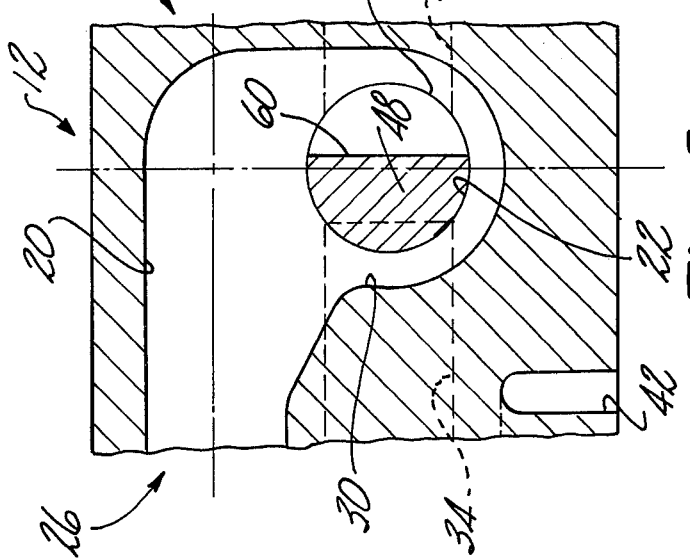

HIGH PRESSURE FILTERING DEVICE

BACKGROUND OF THE INVENTION

1. Field of the Invention

The present invention relates to filtering devices, and more particularly to improvements in duplex filtering devices of the type comprising a pair of filter elements so arranged that the flow of fluid to be filtered can be changed from one element to the other so that as one element is brought into service the other is automatically withdrawn from service.

2. Description of the Prior Art

A number of multiple filter devices have been previously known including a duplex device quite similar to the present device and owned by the assignee of the present invention. U.S. Pat. No. 3,618,781 is, however, directed to a duplex filtering device intended for use in relatively low pressure systems. The present invention incorporates features permitting its use in operating ranges of 5000 psi. In applicant's previously disclosed device the selector valve would be difficult to actuate at such high pressures and it would be subject to severe sealing problems.

SUMMARY OF THE INVENTION

The present invention provides a duplex filtering device capable of use in relatively high pressure systems. The filtering device comprises a housing having an inlet port for receiving fluid to be filtered, two inlet passageways, each providing a fluid path to a different one of two filtering elements which are removably carried by the housing to filter the fluid, and two outlet passageways each providing a fluid path for the fluid from a different one of the filter elements to a common outlet port. A pressure balanced selector valve is provided in the housing between the two inlet passageways and between the two outlet passageways to open fluid flow to one of the filter elements and to isolate the other filter element from fluid. A pilot valve permits the fluid pressure within the fluid filter device to be selectively balanced across the selector valve to permit easy movement of the valve. Means are also provided to eliminate distortion of the valve due to the high pressure being exerted on one side of it by fluid in the inlet and outlet passageways leading to the filter element in use at any given time. High pressure fluid is directed to the opposite side of the selector valve to thereby relieve distortion and to aid in sealing.

Drain openings are provided in the housing at opposite ends of the selector valve to provide a path for any fluid which may leak from the inlet and outlet passageways between the selector valve and the housing.

Each of the filtering elements is connected to the housing by means of a collar which is retained on the housing by a plurality of bolts received through relatively smooth walled apertures in the collars and threaded apertures in the housing. An O-ring seal is disposed between each of the collars and the housing to prevent fluid leakage therebetween. The bolts are constructed of a relatively elastic metal so that in the event of a surge of extremely excessive pressure, the bolts will stretch permitting the fluid to leak past the O-ring seals. In high pressure systems such surges have in the past often caused damage to the housing and this construction is intended to direct such damage instead to a plurality of bolts which can be easily replaced.

Each of the inlet passageways is in fluid communication with a different one of the outlet passageways. Cartridge type indicators having by-pass valves operatively associated therewith are disposed in the housing proximate the means of fluid communication between the respective inlet and outlet passageways.

DESCRIPTION OF THE DRAWINGS

The following description refers to the accompanying drawings in which like numerals refer to like parts throughout the several views, and in which:

FIG. 3 is a partial view in section of the device as viewed in the direction of the arrows 3—3 in FIG. 2;

FIG. 4 is a sectional view taken along the line 4—4 of FIG. 1;

FIG. 5 is a diagrammatic sectional view taken along the line 5—5 of FIG. 1;

FIG. 6 is a diagrammatic sectional view similar to FIG. 4, but illustrating the selector valve rotated 180°, and FIG. 7 is a diagrammatic sectional view similar to FIG. 5, but illustrating the selector valve rotated 180°.

DETAILED DESCRIPTION OF THE PREFERRED EMBODIMENT

Figure 1:
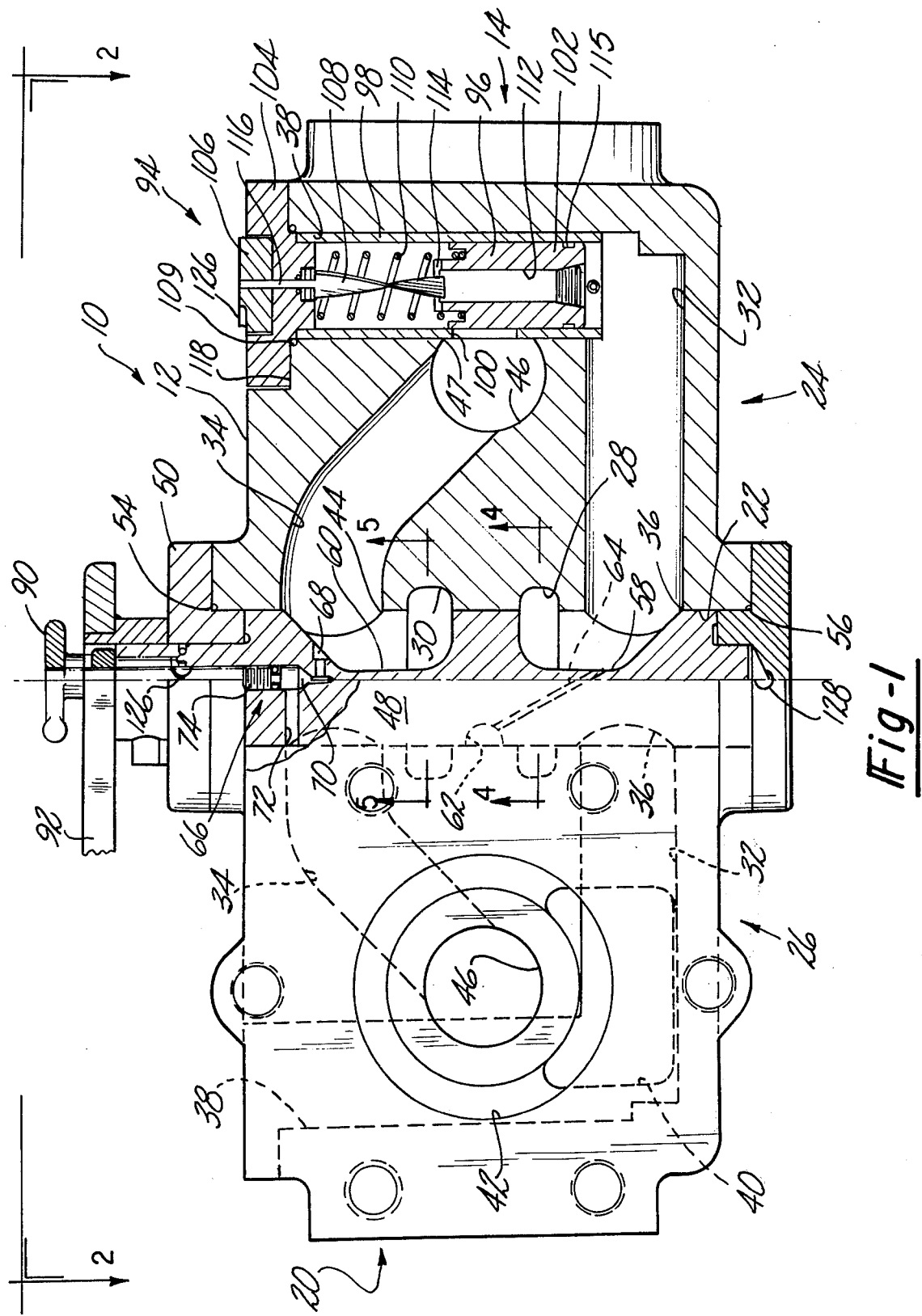
FIG. 1 is a front view partially in section of a filter device according to the present invention.

Referring to the drawings, there is illustrated a filtering device 10, according to the present invention, which is to be installed in a fluid carrying conduit (not shown) to filter the fluid passing therethrough. The filtering device 10 comprises a housing 12 having an inlet 14 through which to receive fluid to be filtered, two conventional generally cylindrically shaped filter housings 15 removably mounted to the housing 12, a filter element 16 disposed within each filter housing 15, and an outlet port 20 through which filtered fluid is reintroduced to the conduit.

The housing 12 further comprises a central bore 22 therethrough which divides the housing into two operating portions. As viewed in the drawings, these portions are a right operating portion 24 and a left operating portion 26.

The central bore 22 is in fluid communication with the inlet port 14 by means of a first elongated pocket 28 formed in the housing. The pocket 28 is disposed at a predetermined location along the longitudinal axis of the bore 22 and is open to both the central bore 22 and the inlet port 14. Likewise, the bore 22 is in fluid communication with the outlet port 20 by means of a second elongated pocket 30, which is similar to the pocket 28, but is disposed at a different location along the longitudinal axis of the bore 22 and is open to both the bore 22 and the outlet port 20.

A pair of inlet passageways 32 and a pair of outlet passageways 34 are formed in the housing 12. One of the inlet passageways 32 is disposed in the right operating portion 24 and the other inlet passageway 32 is disposed in the left operating portion 26. Similarly, one of the outlet passageways 34 is disposed in the right operating portion 24 and the other outlet passageway 34 is disposed in the left operating portion 26.

A selector valve 48 is rotatably disposed in the central bore to provide means for selectively connecting either the right operating portion 24 or the left operating portion 26 to the inlet port 14 and the outlet port 20. When one of the operating portions 24-26 is connected between the inlet port 14 and the outlet port 20 the other portion is isolated therefrom by the selector valve 48.

Because the right and left operating portions 24 and 26, respectively, are substantially identical, the filtering device 10 being symmetrical about the longitudinal axis of the bore 22, and because they are placed into operation alternately, the following description is directed to the right operating portion 24 for clarity, it being understood that the description applies equally to the left operating portion 26 as well.

The inlet passageway 32 is open at one of its ends 36 to the central bore 22 adjacent the first elongated pocket 28, is open to the exterior of the housing 12 at its other end 38, and is open to the filter element 16 between its ends 36 and 38.

The opening of the inlet passageway 32 to the filter element 16 comprises a cavity 40 open to the inlet passageway 32, and an annular aperture 42 open to the cavity 40 and open to the exterior of the housing 12 at the location where the filter element 16 is mounted to the housing, the annular aperture 42 being substantially concentric with the exterior wall of the filter housing 15. Thus, fluid communication is established between the inlet port 14 and the filter element 16.

The outlet passageway 34 is open at one of its ends 44 to the bore 22 adjacent the second elongated pocket 30, and is open at its other end 46 to the exterior of the housing 12 at the location where the filter housing 15 is mounted to the housing, the open end 46 being coaxial with the annular aperture 42. Thus, fluid communication is established between the outlet port 20 and the filter element 16.

The inlet passageway 32 is in fluid communication with the outlet passageway 34 by means of a bypass aperture 47 disposed between the cavity 40 and the open end 38 of the inlet passageway 32 and between the ends 44 and 46 of the outlet passageway 34.

The selector valve 48 is formed with a first open notch 58 in its wall disposed to one side of its longitudinal axis at a predetermined location along the axis, and a second open notch 60 in its wall aligned with and disposed in spaced relationship to the first notch 58 at another predetermined location along the longitudinal axis of the selector valve 48. The predetermined location and size of the first notch 58 is such that it encompasses both the first elongated pocket 28 and the open end 36 of the inlet passageway 32 to the bore 22. The predetermined location and size of the second notch 60 is such that it encompasses both the second elongated pocket 30 and the open end 44 of the outlet passageway 34 to the bore 22.

A third notch 62 is formed in the wall of the selector valve 48 on the opposite side of the longitudinal axis thereof from that side to which the first and second notches 58 and 60 are disposed, and is disposed along the longitudinal axis of the selector valve 48 midway between the axial locations of the first and second notches 58 and 60, so that it is in line with that portion of the housing 12 which separates the open end 36 of inlet passageway 32 from the open end 44 of the outlet passageway 34. The third notch 62 is in constant fluid communication with the first notch 58 by means of a passage 64.

Preferably, the wall of the bore 22 and a wall of the selector valve 48 are lapped and fitted to create a smooth surface-to-surface interface therebetween. The selector valve 48 is retained in position by a top cap 50 and a bottom cap 52. An O-ring 54 is disposed between the top cap 50 and housing 12 and another O-ring 56 is disposed between the bottom cap 52 and the housing 12 to prevent leakage therebetween of the fluid being processed through the device 10.

The selector valve 48 further comprises a balancing valve 66 which provides for selectively balancing the fluid pressure being exerted on opposite sides of the selector valve 48 so that the valve can be rotated. During use the selector valve 48 is subjected to high pressure fluid on the operating side and low pressure on the isolated side. Without means to balance the pressure across the selector valve 48 before rotation thereof such rotation would be difficult if not impossible. The balancing valve 66 comprises an inlet aperture 68 open at one end to the second notch 60, a valve seat 70 formed near the other end of the aperture 68, and an outlet aperture 72 open at one of its ends to the valve seat 70 and at its other end to the wall of the selector valve 48 on the opposite side thereof to the second notch 60, thus, placing the outlet passageways 34 in fluid communication. A valve member 74 is disposed in the selector valve 48 to move axially therein to engage and disengage the valve seat 70 thereby closing and opening the fluid communication between the outlet passageways. The axial movement of the valve member 74 is controlled by means of a handle 90 extending outwardly from the top end of the selector valve 48 to provide manual manipulation. The selector valve 48 is rotated by means of a handle 92 which is connected to the top end of the selector valve 48 by any suitable means.

A drain port 126 is disposed in the top cap 50 and another drain port 128 is disposed in the bottom cap 52. These drain ports 126 and 128 are in fluid communication with the central bore 22 above and below the first and second notches 58, 60 respectively, of the selector valve 48 and provide a means of draining away any fluid which may leak between the selector valve 48 and central bore 22.

As can best be seen in FIG. 1, a combination indicator 94 and a by-pass valve 96 in slidably received as a unit in the inlet passageway 32 through its open end 38 such that the by-pass valve 96 normally closes the aperture 47 which provides fluid communication between the inlet passageway 32 and the outlet passageway 34, and such that the indicator 94 is visible from the exterior of the housing 12. The combination indicator 94 and by-pass valve 96 comprises an open ended cylindrical case 98 having an aperture 100 in its wall, a piston 102 axially slidable in the case 98, an end cap 104 closing the top of the case 98, an indicator dial 106 mounted in and carried by the cap 104, a spiral actuating rod 108 interconnecting the dial 106 and the piston 102 and a coil spring 110 which biases the piston 102 downward in the cylinder case 98.

The piston 102 is provided with a sealing ring 115 which sealably and slidably contacts the interior wall of the case 98 to prevent leakage between the piston 102 and interior wall of the cylindrical case 98, an axially disposed bore 112, and a slotted cap 114 positioned coaxially with the bore 112 at the top of the piston 102. The sides forming the slot in the cap 114 engage the spiral actuating rod 108. When the piston is located in the bottom of the cylindrical case 98 it closes the aperture 100, and when it is located near the top portion of the cylindrical case 98 it clears aperture 100 thereby opening it.

Still referring to FIG. 1, the dial 106 is rotatably mounted in the cap 104 by means of a shaft 116 mounted in the cap 104 for rotation about its longitudinal axis. One end of the shaft 116 is connected to the dial 106 and the other end is connected to the spiral rod 108 such that axial movement of the piston 102 acts through the spiral rod 108 and the slotted cap 114 to produce rotation of the shaft 116 and the dial 106. An O-ring seal 109 is disposed between the shaft 116 and the cap 104 to prevent leakage of fluid.

The combination indicator 94 and by-pass valve 96 constitutes a single cartridge-like assembly which is installed in, and removed from the device 10 as a unit. When the combination indicator 94 and by-pass valve 96 is installed in the inlet passageway 32, the cap 104 rests on a shoulder 118 of the housing 12, and the aperture 100 generally mates with the aperture 47 between the inlet and outlet passageways. It should be noted at this point that the cartridge-like indicator 94 and by-pass valve 96 is slidably installed in inlet passageway 32.

Figure 2:
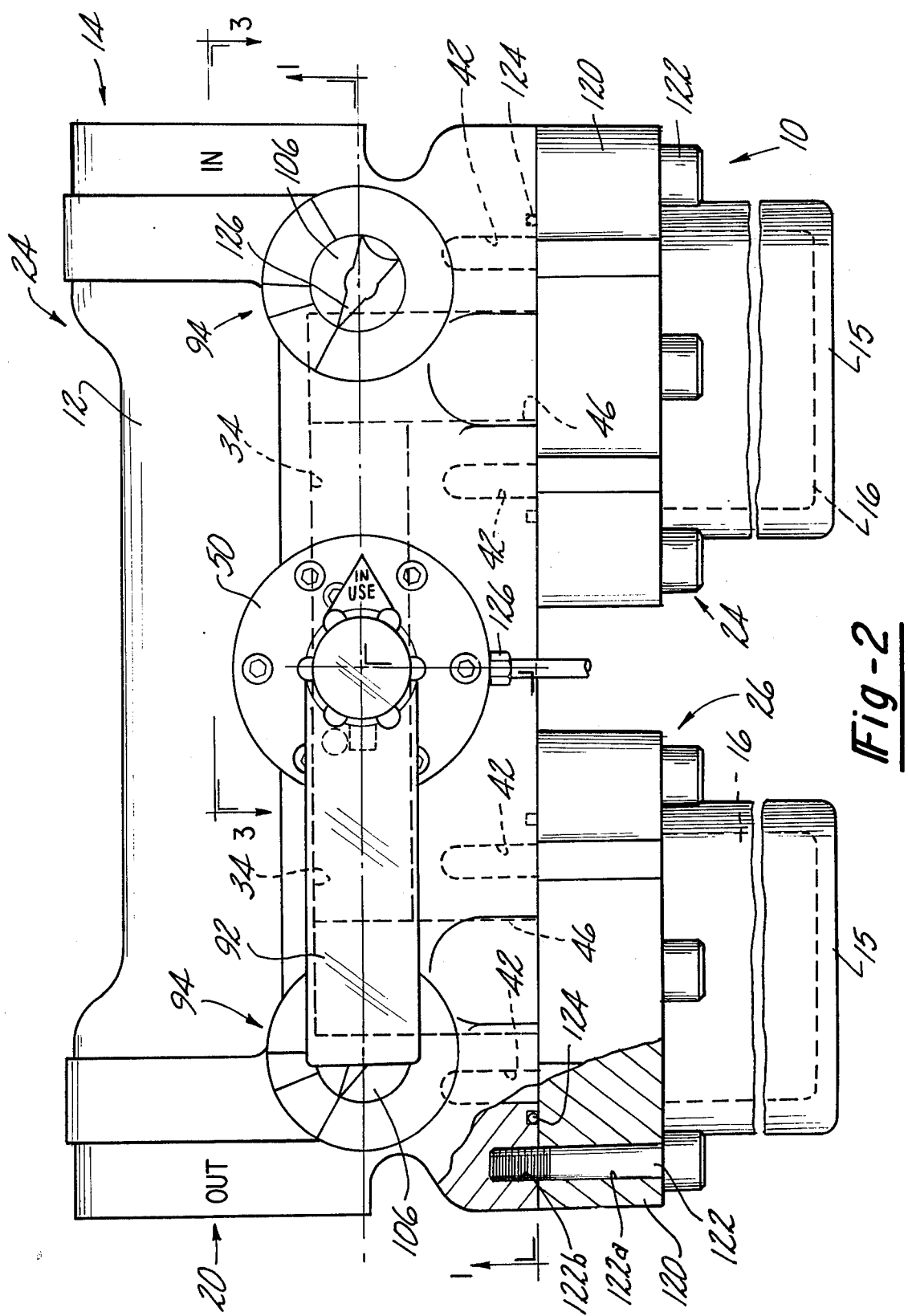
FIG. 2 is a top view of the device as viewed in the direction of arrows 2—2 in FIG. 1.

As can best be seen in FIG. 2, the filter housing 15 is removably mounted to the housing 12 by means of a collar 120 which is retained in place on the housing by a plurality of bolts 122. Each bolt 122 is slidably received through a relatively smooth walled bore 122a in the collar and threadably received in a threaded bore 122b in the housing 12. Only the end portion of the shank of the bolt 122 received in the threaded bore 122b of the housing is threaded, the central portion between the threaded end and the head, being the portion extending through the bore in the collar 120, is relatively smooth. An O-ring seal 124 is disposed between the collar 120 and housing 12 to prevent leakage therebetween (see FIG. 2).

FIG. 2 illustrates the handle 92 in a first position which orients the selector valve 48 to connect the right operating portion 24 of the filtering device 10 to the inlet port 14 and outlet port 20 and FIGS. 4 and 5 illustrate the position of the selector valve 48, particularly the position of the first open notch 58 and second open notch 60, when the right operating portion 24 is connected with the fluid circuit.

It should be noted that when the selector valve 48 is in position to connect the right operating portion 24 into the system the handle 92 extends across the indicating dial 106 of the left operating portion to obstruct it from view and to clearly indicate which portion of the filtering device is in operation.

With the selector valve 48 in the position illustrated in FIGS. 4-5, fluid under pressure enters the inlet port 14, travels into the first elongated pocket 28, into the first notch 58 of the selector valve 48, through the open end 36 of the inlet passageway 32, through the inlet passageway 32 into the cavity 40 and, hence, into the annular aperture 42 which distributes the fluid around the outer periphery of the wall of the filter element 16 radially inwardly through the filter element 16 into the interior thereof, axially outwardly of the filter element 16 through the open end 46 of the outlet passageway 34, through the open end 44 thereof, into the second notch 60 in the selector valve 48, into the second elongated pocket 30 and then through the outlet port 20.

If the filter element 16 becomes clogged, the fluid pressure in the inlet passageway 32 increases exerting an increasing force on the end of the piston 102 of the by-pass valve 96. When this force exceeds the spring modulus of the coil spring 110, the piston 102 moves axially upwardly in the cylindrical case 98 to a point corresponding to a predetermined pressure where it moves past the aperture 100, thus, opening the by-pass aperture 47 between the inlet passageway 32 and outlet passageway 34. When this occurs, the fluid in the inlet passageway 32 flows upwardly through the cylindrical case 98, through the aperture 100 in the wall of the case 98, through the by-pass aperture 47, into the outlet passageway 34, through the open end 44 of the outlet passageway 34 into the second notch 60 of the selector valve 48, into the second elongated pocket 30 and then through the outlet port 20, thus, by-passing the clogged filter element 16.

As the piston 102 moves axially upwardly in the case 98, the slotted cap 114 moves along the spiral rod 108 and in doing so causes the shaft 116 and indicator dial 106 to rotate, and indicate, by means of a pointer 127 connected to the dial 106 and registering with appropriate indicia, the clogged condition of the filter element 16.

The device 10 is intended for high pressure use and the fluid pressure in the inlet and outlet passageways 32 and 34, respectively, produces a relatively strong force against the selector valve 48 in the first and second notches 58 and 60, respectively, which force causes the selector valve 48 to be forced against the wall of the central bore 22 thereby creating a sealing surface to surface contact between the lapped and fitted surfaces of the selector valve 48 and the wall of the central bore 22 in the area of the openings 44 of the inlet and opening 46 of the outlet passageway of the left operating portion 86.

However, the force exerted on the selector valve 48 which produces the surface-to-surface seal also would ordinarily allow fluid to leak between the first and second notches 58 and 60 due to the fact that the selector valve 48 would be forced away from the wall of the central bore 22 in the area between these notches. The third notch 62 being in constant fluid communication with the inlet passageway 32 provides a balancing force exerted by the fluid on both sides of the selector valve 48 between the first and second notches, thus, eliminating deformation of the selector valve 48 in this area and preventing leakage of fluid between the first and second notches.

Any fluid which may leak between the selector valve 48 and the wall of the bore 22 is carried by the drain ports 126 and 128 back to, for example, a reservoir by means of tubing (not shown). This eliminates the need for seals which would be difficult to maintain anyway under the high operating pressures utilized with the filtering device 10 of the present invention.

When the filter element 16 on the right side of the device becomes clogged, the handle 92 is rotated to a second position 180° from the first position. This rotates the selector valve 48 from the position illustrated in FIGS. 4-5 to the position illustrated in FIGS. 6-7. The right operating portion 24 is thus isolated from the fluid circuit and the left portion 26 of the filtering device 10 is fluidly connected to the inlet port 14 and outlet port 20. The filter element 16 of the right operating position now being isolated from the fluid conduit, can be removed for cleaning or replacement.

As mentioned above, during operation, a force is exerted on the selector valve 48 which deflects the selector valve away from the operating portion 24 to create a surface to surface seal between the selector valve and wall of the bore 22. This force tends to hinder any easy rotational movement of the handle 92 and the selector valve 48 from the first position to the second position. In order to facilitate easy turning of the handle 92 and the selector valve 48, it is necessary to balance the force exerted on the selector valve 48. To balance this force, the valve member 74 of the balancing valve 66 is axially disengaged from the valve seat 70 by manually turning the handle 90. This allows fluid to flow from the second notch 60 through the inlet aperture 68 and outlet aperture 72 to the outlet passageway 34 on the opposite side, or left operating side 26, of the selector valve 48, thus balancing the forces exerted by the fluid on the opposite sides of the selector valve 48. When the handle 92 and selector valve 48 are rotated to the second position, the valve member 74 is reseated in the valve seat 70 by rotating the handle 92 in the opposite direction thereby restoring the desired force unbalance on the selector valve 48 to sealably isolate the now idle right portion 24 from the now operating left portion 26.

The filter mounting collar 120 and retaining bolts 122 provide a fail-safe feature to guard against a burst failure of the device 10 in the event of a sudden high pressure surge in the system. In that event, the fluid pressure in the inlet passageway 32 and surrounding the filter element 16 will develop a force which tends to push the filter housing 15 away from the housing 12. The bolts 122 have a yield strength corresponding to a force which is less than the force which would burst the housing 12 or the housing 15. Thus, at the yield point of the bolts 122 they will stretch allowing a failure of the O-ring 124 and providing a controlled path for the pressurized fluid to leak from the device 10. Repair then can be accomplished simply by replacing the bolts 122. Such a safeguard is extremely important in high pressure systems such as those contemplated by the present invention.

The foregoing detailed description is given primarily for clarity of understanding and no unnecessary limitations should be understood therefrom, for modifications will be obvious to those skilled in the art and may be made without departing from the spirit of the invention or the scope of the appended claims.

Having thus described the present invention, what is claimed is:

1. A filtering device comprising:
    a housing having an inlet port and an outlet port, a pair of filter elements disposed intermediate said inlet port and said outlet port, valve means disposed within said housing and selectively operable to open fluid communication from said inlet port through one of said filter elements and to said outlet port and to isolate said other filter element from said inlet port and said outlet port, and means directing fluid under pressure against a portion of said valve means opposite the filter element open to communication with said inlet port and said outlet port to provide a means for sealing said valve means and including a filter housing for each of said filter elements and means mounting said filter housing to said housing, said last mentioned means comprising bolts, said bolts including a threaded portion and a smooth walled portion, the smooth wall portion engaging said filter housing, the threaded portion engaging said housing, said bolts having an elasticity predetermined to permit said bolts to elongate upon a predetermined pressure being produced within said filter housing.

2. A filtering device as defined in claim 1, wherein said valve means comprises:
    a generally cylindrically shaped valve body disposed within a bore in said housing, said valve body having a first open notch disposed to one side of the longitudinal axis of said valve body and a second open notch in line with, and spaced from said first open notch in the axial direction of said valve body,
    said first notch being in constant fluid communication with said inlet port, and alternately in fluid communication with each of said pair of filter elements, thus, providing for selectively opening and closing of the means of fluid communication of each of said pair of filter elements with said inlet port,
    said second notch being in constant fluid communication with said outlet port, and alternately in fluid communication with each of said pair of filter elements, thus, providing for selectively opening and closing of the means of fluid communication of each of said pair of filter elements with said outlet port,
    said fluid directing means comprising the fluid pressure associated with said filter element in fluid communication with said second notch exerting a force against a portion of said valve body to urge it into a fluid sealing abutment with the wall defining said bore, the fluid pressure in fluid communication with said first notch exerting a force against a portion of said valve body to urge it into a fluid sealing abutment with the wall defining said bore; said valve tody having a third notch disposed to the opposite side of the longitudinal axis of said valve body from that side thereof to which said first and second notches are disposed, and being generally opposite to that portion of said valve body between said spaced apart first and second notches; means for fluidly connecting said first notch with said third notch, whereby the fluid pressure exerted against opposite sides of said valve body in the area of said portion of said valve body between said spaced apart first and second notches is balanced.

3. A filtering device as defined in claim 1 and including said housing being formed with a central bore and a pair of inlet passageways each having one of its ends open to said central bore and another of its ends open to the exterior of said housing;
    each of said pair of inlet passageways is open to a different one of the filter elements;
    a second valve means removably received in said end of one of said pair of inlet passageways open to the exterior of said housing to normally close fluid communication between said inlet passageways with said outlet; and
    said second valve means being removably received in said end of the other one of said pair of inlet passages open to the exterior of said housing to normally close fluid communication between the other one of said inlet passageways with said outlet.

* * * * *